J. M. Weare.
Dairy Implement.
N° 10,870. Patented May 2, 1854.
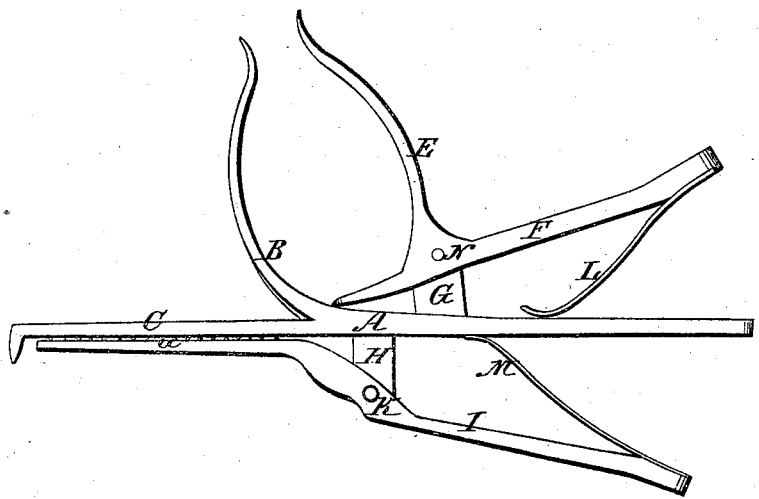

UNITED STATES PATENT OFFICE.

JOHN M. WEARE, OF SEABROOK, NEW HAMPSHIRE.

MILKER'S PROTECTOR.

Specification of Letters Patent No. 10,870, dated May 2, 1854.

*To all whom it may concern:*

Be it known that I, JOHN M. WEARE, of Seabrook, in the county of Rockingham and State of New Hampshire, have invented a new and useful Instrument, which I term the "Milker's Protector;" and I do hereby declare that the same is fully described and represented in the following specification and the accompanying drawing, letters, figures, and references thereof.

The object of my invention is to enable a milkmaid or person while milking a cow to secure the tail of the animal so as to prevent it from being whisked about, or in other words to prevent the cow from striking a person with her tail, an occurrence which is very common and of great annoyance to those who perform the operations of milking.

In the said drawing, A, denotes a metallic bar not only having a curved jaw, B, and a projection, G, extended from one side of it, but a similar projection H, extended from the other side of it, the whole being arranged as seen in the drawing. The projection, G, sustains the fulcrum pin N, of a lever, F, from one side of which lever a curved jaw E is extended, while a spring L, is attached to the other side and longer arm of the lever and made to bear against the bar, A. A bent lever, I, is arranged on the opposite side of the bar A, and has its fulcrum K, supported by the projection, H, the front arm of the lever I, and the foot, C, of the bar, A, forming nippers, which are forced toward one another by the action of a spring M, affixed to the other arm of the lever, I, and made to bear against the bar, A, the several parts being arranged with respect to one another as seen in the drawing.

In the use of the instrument the two jaws or nippers, B, and, E, are applied to the hamstring of a cow's hind leg, so as to embrace it between them and confine the instrument to the leg. This done, the lever, I, is to be pressed so as to cause its front arm or jaw $a$, to move away from the part or stationary jaw, C, and the tail of the cow or the brush or hair thereof is to be inserted between the two jaws, and the lever, I, released, so as to permit the spring, M, to close the jaws on the tail or part thereof placed between them. When so applied the cow's tail will be held firmly by the instrument during the milking process.

I claim—

The "milker's protector" constructed substantially as specified, viz. of a combination of hamstring and tail nippers applied together and made to operate essentially as described.

In testimony whereof I have hereunto set my signature this fourteenth day of February, A. D. 1854.

JOHN M. WEARE.

Witnesses:
OLIVER EATON,
JAMES FOGG.